United States Patent
Schwartz et al.

(10) Patent No.: US 8,020,037 B1
(45) Date of Patent: Sep. 13, 2011

(54) CREATION OF A TEST BED FOR TESTING FAILOVER AND FAILBACK OPERATIONS

(75) Inventors: Barry Schwartz, San Jose, CA (US); Colin Johnson, San Francisco, CA (US)

(73) Assignee: NetApp, Inc., Sunnyvale, CA (US)

( * ) Notice: Subject to any disclaimer, the term of this patent is extended or adjusted under 35 U.S.C. 154(b) by 323 days.

(21) Appl. No.: 12/236,212

(22) Filed: Sep. 23, 2008

(51) Int. Cl.
*G06F 11/00* (2006.01)
(52) U.S. Cl. .................................... 714/6.3; 714/41
(58) Field of Classification Search ............ 714/6.3, 714/41
See application file for complete search history.

(56) References Cited

U.S. PATENT DOCUMENTS

| | | | |
|---|---|---|---|
| 7,114,094 B2 * | 9/2006 | Soejima | 714/6 |
| 7,293,192 B2 * | 11/2007 | Allen et al. | 714/6 |
| 7,392,421 B1 * | 6/2008 | Bloomstein et al. | 714/4 |
| 7,603,581 B2 * | 10/2009 | Boyd et al. | 714/6 |
| 7,606,841 B1 * | 10/2009 | Ranade | 1/1 |
| 2003/0126388 A1 * | 7/2003 | Yamagami | 711/162 |
| 2010/0017184 A1 * | 1/2010 | Vijayan Retnamma et al. | 703/13 |
| 2010/0192008 A1 * | 7/2010 | Beardsley et al. | 714/6 |

* cited by examiner

*Primary Examiner* — Christopher McCarthy
(74) *Attorney, Agent, or Firm* — Schwegman, Lundberg & Woessner, P.A.

(57) ABSTRACT

Example embodiments provide various techniques for creating a test bed for testing failover and failback operations. In an example, data is stored on a primary storage system, while a backup copy of the data is stored on a secondary storage system. A test bed may be created by replicating the data on the primary storage system and replicating the backup copy on the secondary storage system. The replicated copies of the data and the backup copy, as well as a process used to backup the data, comprise the test bed, which may be used to test the failover and failback operations.

19 Claims, 11 Drawing Sheets

CREATION OF A TEST BED FOR TESTING FAILOVER AND FAILBACK OPERATIONS

FIELD

The present disclosure relates generally to storage systems. In an example embodiment, the disclosure relates to the creation of a test bed for testing failover and failback operations.

BACKGROUND

Data is backed up to guard against unforeseen data loss. Typically, data is backed up onto a separate storage system where, in the event of a data loss, the backup copy of the data can be made available for use. This is accomplished by using a failover mechanism to provide expedient access to the backup copy stored on the secondary storage system in the event of a failure of the primary storage system. Once the primary storage system is operational, the data then is returned to use. This is accomplished by using a failback mechanism that moves the latest set of the backup copy of the data back to the primary storage system.

There is no guarantee that the failover and failback mechanisms will work in the event of a data loss unless such mechanisms are tested. Currently, dedicated storage systems that are separate from the actual production storage systems may be setup to test the failover and failback mechanisms. However, the setup of separate storage systems simply for testing of these mechanisms is expensive. Furthermore, the test may not be reliable because the test storage systems may be slightly different than the actual production storage systems. The alternative is to test on live or production storage systems, but such tests may render the data in use inaccessible for the duration of the tests and may also corrupt the data in the event that the failover and failback testing fail.

SUMMARY

Example embodiments provide various techniques for the creation of a test bed. Generally, data that is in actual use is stored on a primary storage system. The data is backed up onto a secondary storage system, which is separate from the primary storage system and serves as a backup to the primary storage system in the event that the primary storage system fails. It should be appreciated that in addition to the secondary storage system, the data may also be backed onto additional storage systems.

A test bed may be created on the primary storage system and the secondary storage system. To create a test bed, data stored on a storage system is copied and stored on the same storage system. For example, the data is replicated on the same primary storage system. That is, a separate copy of the data is made and this copy is stored on the same primary storage system. Similarly, the backup copy of the data stored on the separate storage system is also replicated on the same separate storage system.

The replicated copies of the data and the backup copy, as well as a process used to backup the data, comprise the test bed. A user may then use the replicated copies of the data and the backup copy for testing the failover operation and the failback operation. That is, tests for failover operation and failback operation may be conducted on copies of the data and the backup copy. Since the test bed uses the same storage systems, such tests do not require additional hardware. Furthermore, tests using the same storage systems are more accurate because the setup is exactly the same as the one used to store the data and backup copy. With the replicated copy of the data stored separately from the actual data, but within the same storage system, tests for failover and failback will not corrupt the actual data, and the actual data is actually still accessible during such tests.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

The description that follows includes illustrative systems, methods, techniques, instruction sequences, and computing machine program products that embody the present invention. In the following description, for purposes of explanation, numerous specific details are set forth in order to provide an understanding of various embodiments of the inventive subject matter. It will be evident, however, to one skilled in the art that embodiments of the inventive subject matter may be practiced without these specific details. In general, well-known instruction instances, protocols, structures and techniques have not been shown in detail.

Figure 1A:
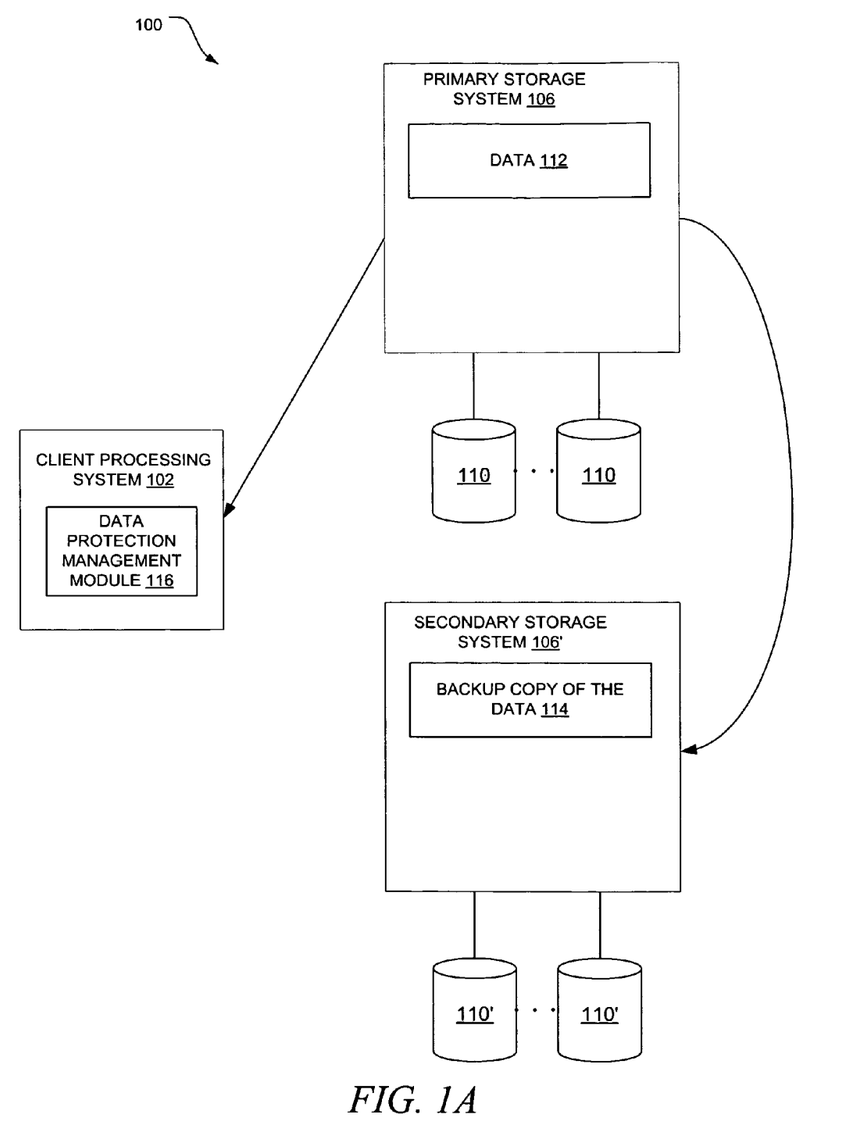
FIGS. 1A and 1B depict block diagrams of an example storage environment, in accordance with an example embodiment, for use in backing up data.
Figure 1B:
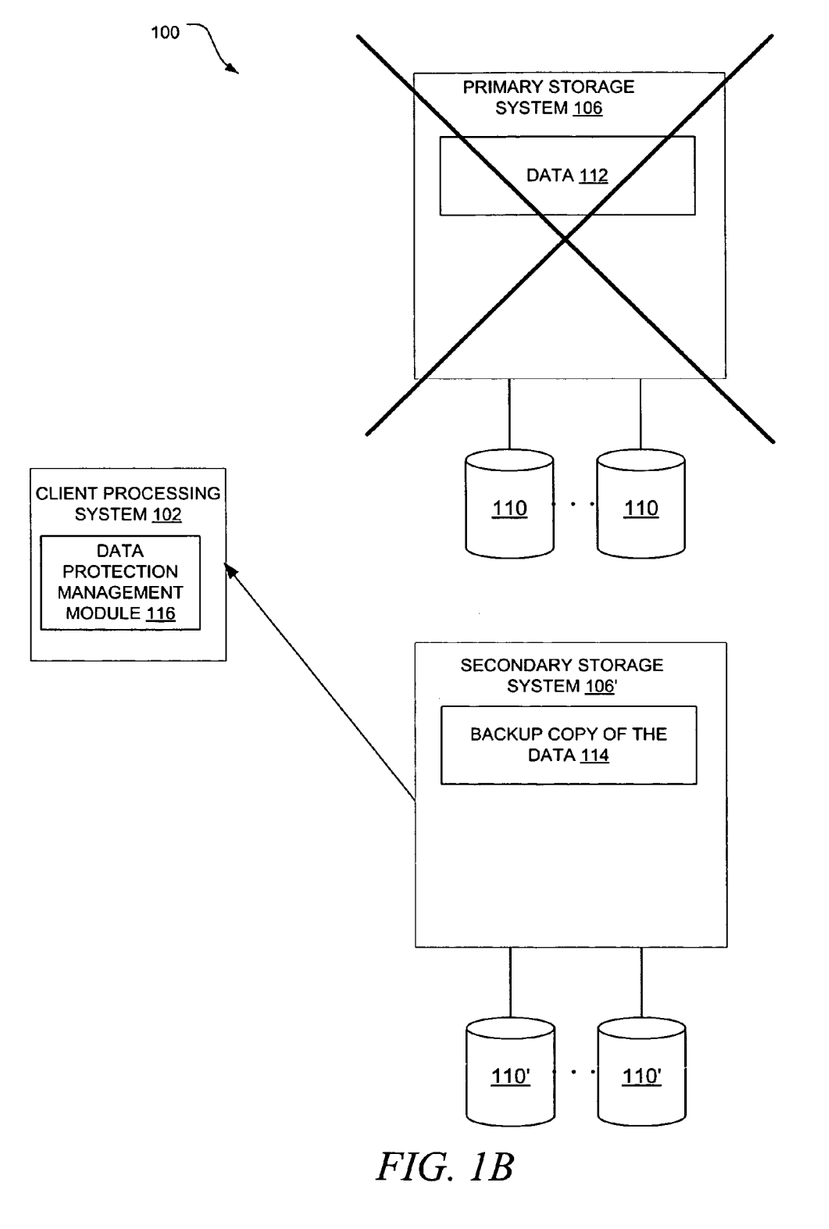

In general, a backup is a copy or duplicate version of a particular set of data that is retained for use in the event that this original set of data is rendered unusable. Depending on the type of storage environment, such a backup copy may be stored on the same storage system as the original set of data or on a separate storage system. FIGS. 1A and 1B depict block diagrams of an example storage environment 100, in accordance with an example embodiment, for use in backing up data 112. As depicted in FIG. 1A, the storage environment 100 includes a client processing system 102, a primary storage system 106, and a secondary storage system 106'. Generally, the storage systems 106 and 106' are processing systems that provide storage services related to the organization of information or data on writable, persistent storage devices 110 and 110', such as non-volatile memories, tapes, hard drives, optical media or other storage devices. The storage systems 106 and 106' can be deployed within a Storage Area Network (SAN) or a Network Attached Storage (NAS) environment.

A SAN is a high-speed network that enables establishment of direct connections between the storage systems 106 and 106' and their storage devices 110 and 110'. The SAN may thus be viewed as an extension to a storage bus and, as such, operating systems of the storage systems 106 and 106' enable access to stored data using block-based access protocols over an extended bus. In this context, the extended bus can be embodied as Fibre Channel, Computer System Interface (SCSI), Internet SCSI (iSCSI) or other network technologies.

When used within a NAS environment, for example, the storage systems 106 and 106' may be embodied as file servers that are configured to operate according to a client/server model of information delivery to thereby allow multiple client processing systems, such as client processing system 102, to access shared resources, such as data 102 and backup copy of the data 114, stored on the file servers. The storage of information on a NAS environment can be deployed over a computer network that includes a geographically distributed collection on interconnected communication links, such as Ethernet, that allows the client processing system 102 to remotely access the information or data on the file servers. The client processing system 102 can communicate with one or more file servers by exchanging discrete frames or packets of data according to predefined protocols, such as Transmission Control/Internet Protocol (TCP/IP).

As depicted in FIG. 1A, the client processing system 112 is in communication with the primary storage system 106. In this example, the client processing system 102 can access data 112 stored on the primary storage system 106. In an example embodiment, the data 112 may be "live data," which is actual real-world data in use. As an example, the data 112 may include database information that is used by an enterprise business application hosted on the client processing system 102. Other examples of data 112 include electronic documents, images, video, and audio files. To protect against unforeseen loss of the data 112, the data 112 is backed up onto the secondary storage system 106'. In general, a backup copy of the data 114 is a duplicate version of the data 112 retained for use in the event that the original data 112 is rendered unusable. As depicted in FIG. 1B, the backup copy 114 is stored in a separate storage system (e.g., secondary storage system 106') such that failure of the primary storage system 106 does not result in a complete loss of the data 112. The storage of the backup copy 114 in a redundant secondary storage system 106' thereby increases data reliability.

Still referring to FIG. 1B, a failure of the primary storage system 106 triggers a failover operation. A failover operation is a recovery action taken in the event that the data 112 is lost. As a result, a failover operation provides access to backup copy 114 stored on the secondary storage system 106' in the event of, for example, a failure of the primary storage system 106. For example, in the event that the primary storage system 106 fails, the client processing system 102 can be reconfigured in a failover operation to point instead to the secondary storage system 106' and thereby access the backup copy 114. Once the primary storage system 106 is operational, a failback operation may be triggered. A failback operation is action taken to restore access to the data 112 on the primary storage system 106. For example, in a failback operation, the most recent backup copy 114 is copied or moved back to the primary storage system 106. The client processing system 102 is then reconfigured to point back to the primary storage system 106 and may thereby access the restored data 112.

The client processing system 102 may host a data protection management module 116 that generally manages the backup of the data 112. As explained in more detail below, the data protection management module 116 includes a feature that creates a test bed. A "test bed," as used herein, is a data set used for testing a failover operation and/or a fail back operation. As explained in more detail below, this data set included in the test bed is separate from the data 112 and the backup copy 114. As a result, a user may conduct tests on the test bed without affecting the integrity of the data 112 and the backup copy 114.

Figure 2:
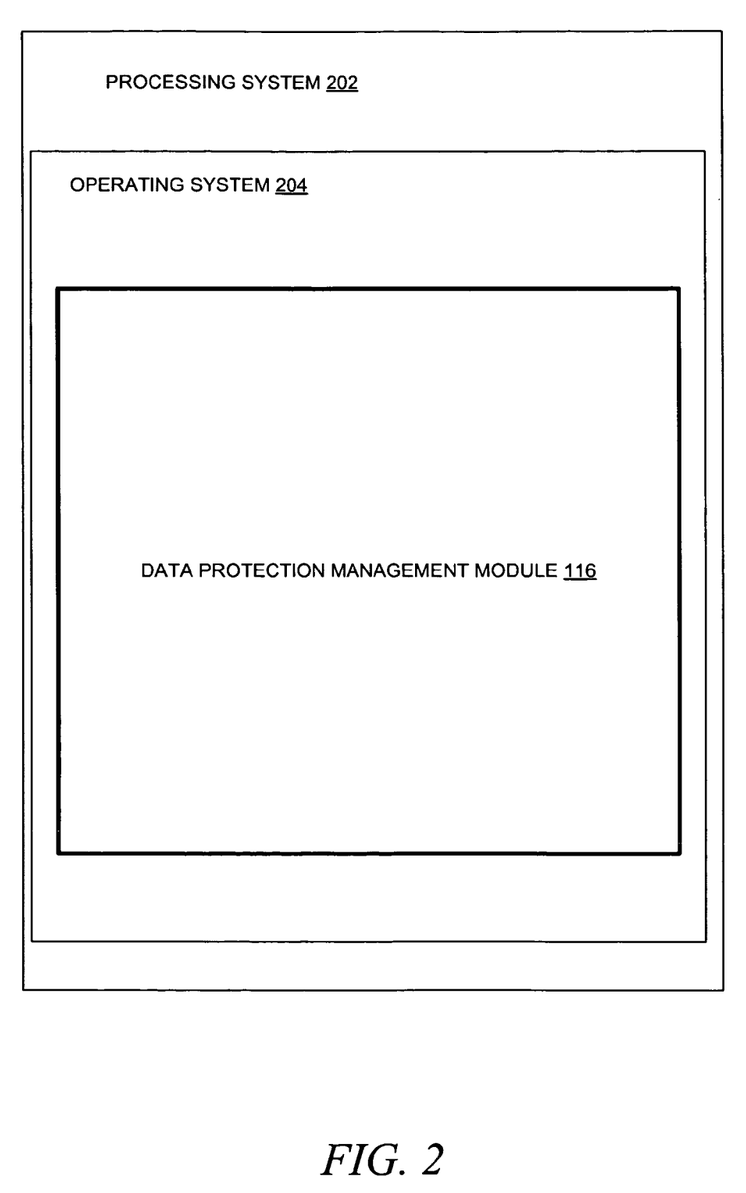
FIG. 2 depicts a block diagram of a data protection management module, in accordance with an example embodiment, included in a processing system that is configured to create a test bed.

FIG. 2 depicts a block diagram of a data protection management module 116, in accordance with an example embodiment, included in a processing system 202 that can create a test bed. It should be appreciated that the processing system 202 may be deployed in the form of a variety of computing devices, such as personal computers, laptop computers, server computers or other computing devices. The processing system 202 may be included in a storage environment. For example, the processing system 202 may be the client processing system 102 included in the storage environment 100 depicted in FIGS. 1A and 1B. In various example embodiments, the processing system 202 may be used to implement computer programs, logic, applications, methods, processes, or other software to create a test bed for testing failover and fail back operations, which is described in more detail below.

The processing system 202 executes an operating system 204 that manages the software processes and/or services executing on the processing system 202. As depicted in FIG. 2, these software processes and/or services may include a data protection management module 116. In general, the data protection management module 116 is a backup and replication management software application that provides automated setup, scheduling, and monitoring of backups. In addition to managing backups, the data protection management module 116 also provides the capability to test failover and failback operations. As will be explained in more detail below, the data protection management module 116 may replicate the data and the backup copy of the data on their respective storage systems. The replicated data and the replicated backup copy of the data may then be used as a test bed for testing failover and failback operations.

Figure 3:
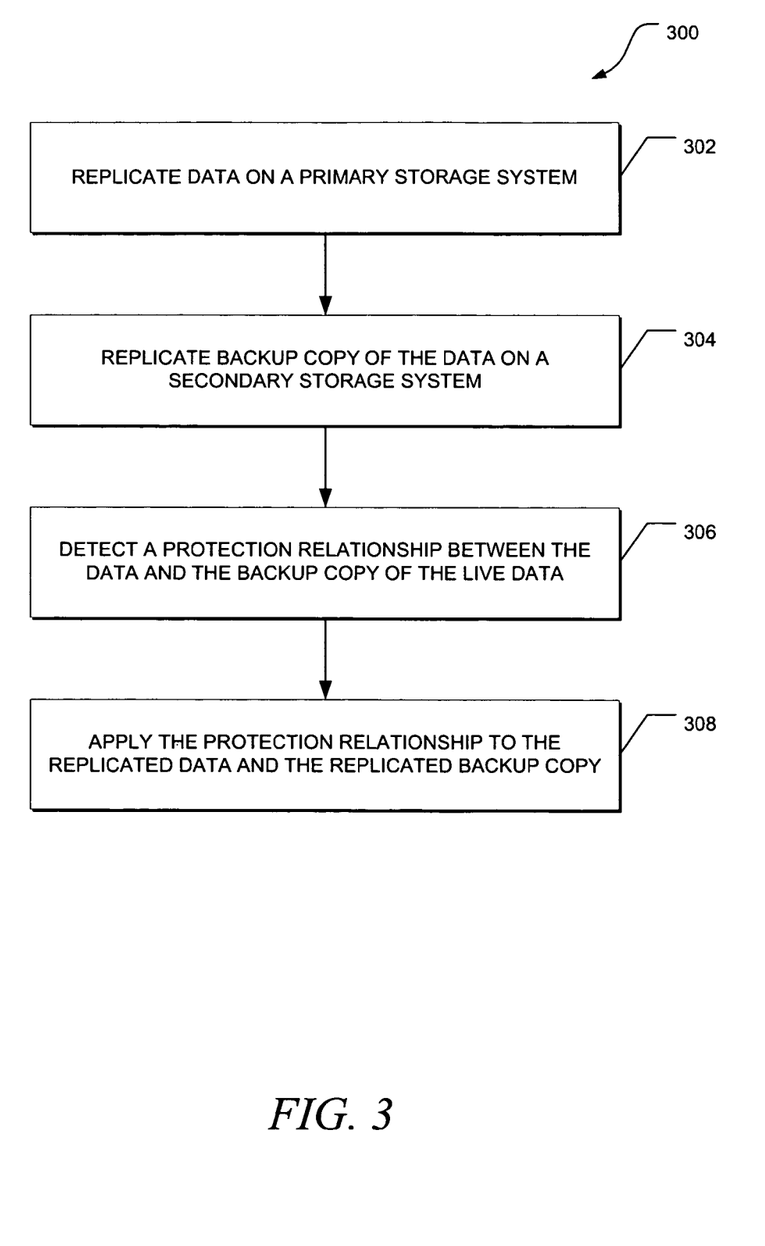
FIG. 3 depicts a flow diagram of a general overview of a method, in accordance with an example embodiment, for creating a test bed.

FIG. 3 depicts a flow diagram of a general overview of a method 300, in accordance with an example embodiment, for creating a test bed. In an example embodiment, the method 300 may be implemented by the data protection management module 116 depicted FIG. 2 and employed in processing system 202. In a storage environment, data is stored on a primary storage system and the backup copy of the data may be stored on one or more secondary storage systems. As depicted at 302, data is replicated on the primary storage system. That is, the data is replicated such as to generate a replicated data or a duplicate copy of the data on the same primary storage system where the data is stored. As explained in more detail below, the data may be replicated by copying the data or creating a modifiable copy from a snapshot. Similarly, at 304, the backup copy of the data is replicated on the secondary storage system. Here, the backup copy is replicated such as to generate a replicated backup copy or a duplicate backup copy of the data on the same secondary storage system where the backup copy is stored.

The data protection management module also detects a backup relationship between the data and the backup copy of the data at 306. The "backup relationship," as used herein, refers to or identifies a process used to create the backup copy of the data. That is, the backup relationship defines how the data is backed up on a separate storage system. An example of a process used to create a backup copy is mirroring. A mirror is an exact copy of a data set and, in the examples discussed herein, the backup copy of the data is a mirror of the data. Here, the data is mirrored onto the secondary storage system to ensure that the backup copy is always kept up-to-date with the data. Mirroring can be synchronous, where, for example, a block of the data written to the primary storage system is also immediately transmitted to the secondary storage system. In asynchronous mirroring, the block of data written to the primary storage system is transmitted to the secondary storage system at a later time. Another example of a process used to create a backup copy is a scheduled backup of the data where the data is backed up to the secondary storage system according to a timetable.

The backup relationship may, for example, be detected by querying a storage system, such as the primary storage system and/or the secondary storage system. For example, the data protection manager module transmits a request to, for example, the primary storage system for the backup relationship. The request may be transmitted by way of, for example, a protocol used in storage systems (e.g., a Network Data Management Protocol (NDMP) or a Simple Network Management Protocol (SNMP)) or by way of application programming interface (API) requests (e.g., Extensible Markup Language (XML) API requests over Hypertext Transfer Protocol (HTTP) or Hypertext Transfer Protocol over Secure Socket Layer (HTTPS)). In response, the primary storage system transmits a response to the data protection management module identifying the backup relationship.

With the backup relationship between the data and the backup copy of the data detected, the same backup relationship may be applied to the replicated data and the replicated backup copy at 308. For example, if the detected backup relationship between the data and the backup copy is a scheduled backup that backs up the data once every day, then the data protection management module also applies the same scheduled backup to the replicated data and that replicated backup copy. As a result, the replicated data is also backed up once every day, as part of a scheduled backup. It should be appreciated that the test bed comprises the replicated data, the replicated backup copy, and the backup relationship between the replicated data and the replicated backup copy. A user may use this test bed for testing a failover operation and/or a failback operation. Since the test bed is separate and independent from the data and the backup copy of the data, the integrities of the data and backup copy are maintained in the event that the replicated data and replicated backup copy included in the test bed are modified. That is, changes made to the replicated data and the replicated backup copy do not affect the data and the backup copy of the data. As a result, during testing for failover or failback, the data is still accessible by client processing systems and the data may still be backed up on the secondary storage system.

Figure 4A:
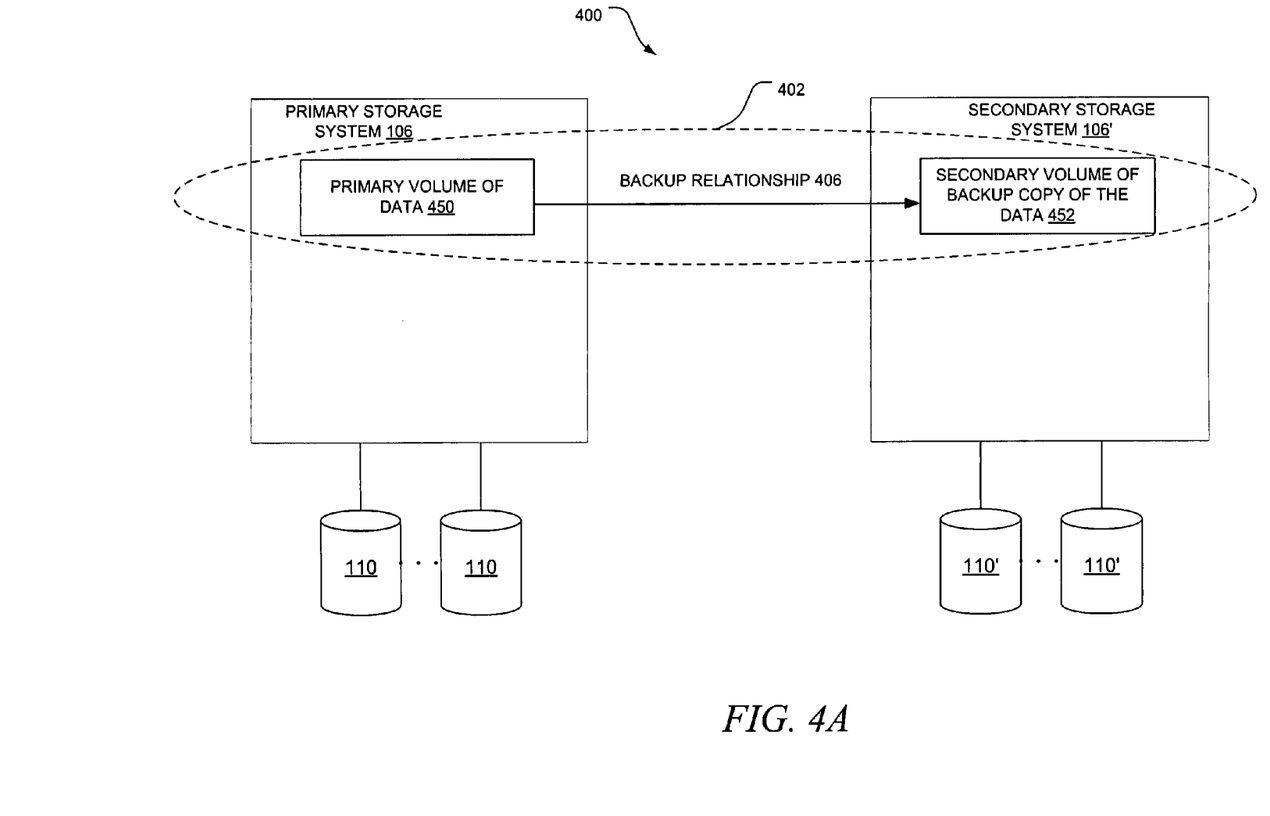
FIGS. 4A and 4B are block diagrams depicting the creation of a test bed in a storage environment 400, in accordance with an example embodiment.
Figure 4B:
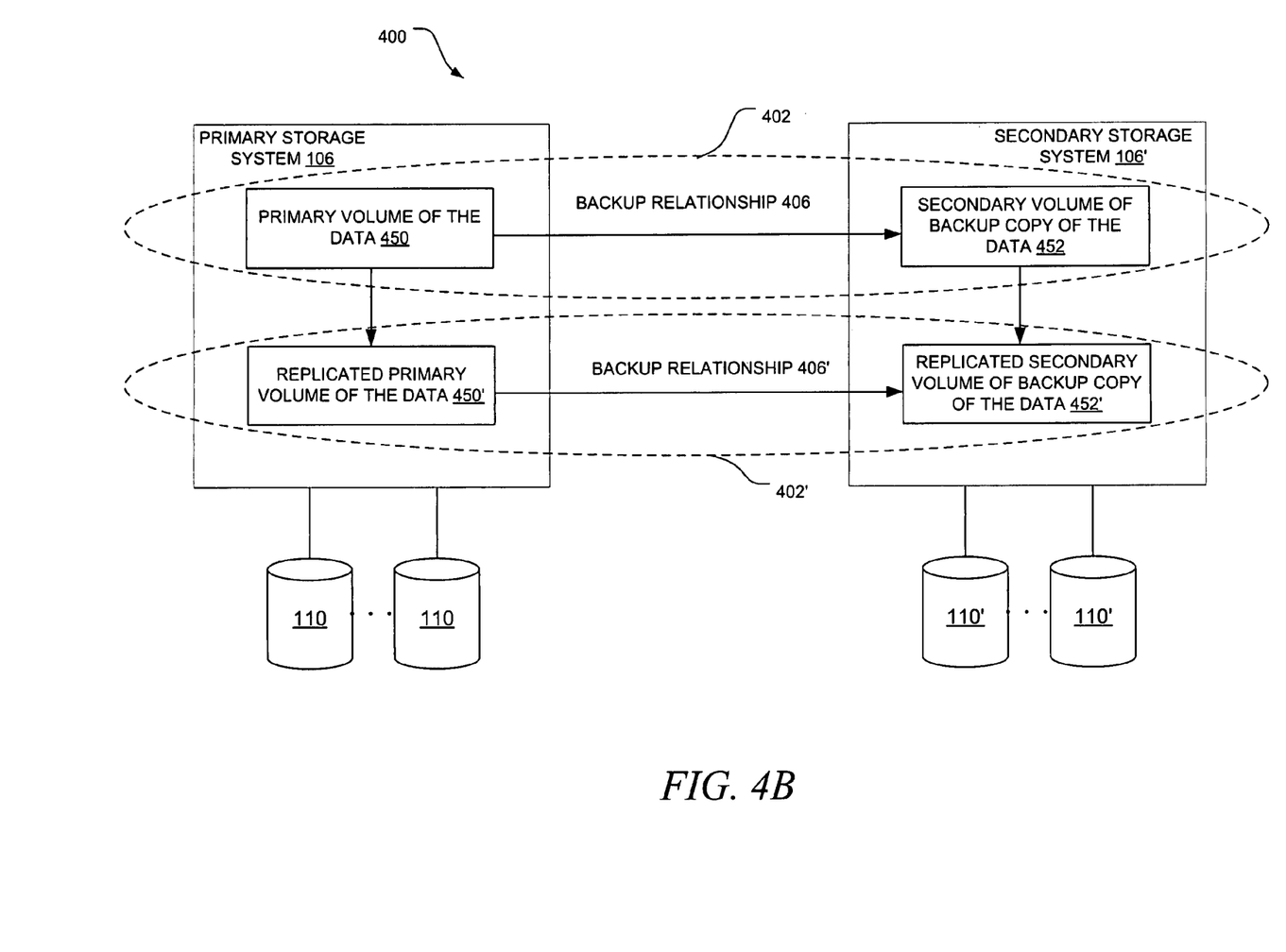

FIGS. 4A and 4B are block diagrams depicting the creation of a test bed in a storage environment 400, in accordance with an example embodiment. As depicted in FIG. 4A, the storage environment 400 includes a primary storage system 106 in communication with a secondary storage system 106'. Data is stored on a primary volume 450 that is allocated on the primary storage system 106. A volume is a logical data container, which serves to reserve storage capacity on persistent storage devices 110 and 110' for applications. The primary volume of data 450 is backed up onto the secondary storage system 106' according to a backup relationship 406. Here, the backup copy of the data is stored on a secondary volume 452 that is allocated on the secondary storage system 106'. It should be appreciated that the primary volume 450, the secondary volume 452, and the backup relationship 406 between the primary volume 450 and a secondary volume 452 may together constitute a data set 402.

As depicted in FIG. 4B, a test bed may be created by replicating the data set 402 within the same storage environment 400. In this example, the data set 402 is replicated by replicating the primary volume 450 on the primary storage system 106 to generate a replicated primary volume of the data 450'. The secondary volume 452 is also replicated on the secondary storage system 106' to generate a replicated secondary volume of the backup copy of the data 452'. The backup relationship 406 associated with the data set 402 is also replicated by detecting the backup relationship 406 and then applying this same backup relationship 406 to the replicated primary volume 450' and the replicated secondary volume 452'.

The replicated primary volume 450', the replicated secondary volume 452', and the backup relationship 406' together constitute a second data set 402'. This second data set 402' serves as a test bed that is accessible for testing failover and failback operations. Being able to test for failover and failback on the same storage systems 106 and 106' that store the data and backup copy of the data, a user that has successfully ran tests using the data set 402' included in the test bed will have greater confidence that failback and failover operations will work in the event of a loss of the data. During testing, the primary volume 430 and the secondary volume 452 are still accessible because the test bed is separate and independent from data set 402. Furthermore, the data integrities of the primary volume 430 and the secondary volume 452 are maintained during testing and, as a result, the data 430 is not at risk for accidental modification.

Figure 5:
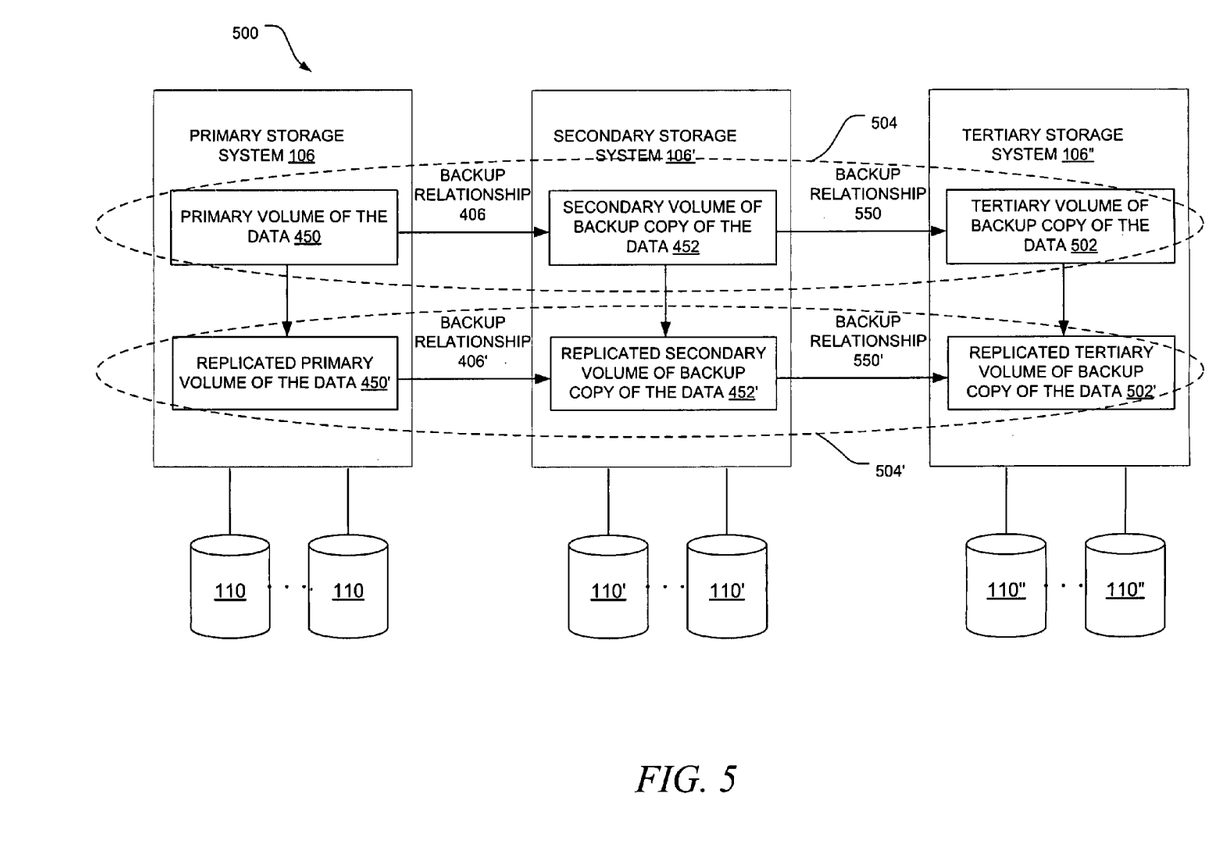
FIG. 5 is a block diagram depicting the creation of a test bed in a different storage environment, in accordance with another example embodiment.

FIG. 5 is a block diagram depicting the creation of a test bed in a different storage environment 500, in accordance with another example embodiment. Here, the storage environment 500 includes a primary storage system 106 in communication with a secondary storage system 106'. Additionally included in the storage environment 500 is a tertiary storage system 106" that is in communication with the secondary storage system 106'. The data is stored on a primary volume 450 that is allocated on the primary storage system 106. The primary volume 450 is backed up onto the secondary storage system 106' according to the backup relationship 406. In this example, the backup relationship 406 may identify that the secondary volume 452 is a mirror of the primary volume 450. For increased data reliability, the secondary volume 452 is further backed up onto the tertiary storage system 106" according to the backup relationship 550. In this example, the backup relationship 550 may identify that the tertiary volume 502 of the backup copy of the data (or backup copy of the backup copy stored on the secondary storage system 106') is a scheduled backup of the secondary volume 452.

In the event of a failure of the primary storage system 106, a failover operation is triggered such that a client processing system (not shown) accessing the primary volume 450 is reconfigured to point to the secondary storage system 106' to instead access the secondary volume 452. As a result, the secondary volume 452 temporarily serves as "data" until the primary storage system 106 is operational. The primary volume 450, the secondary volume 452, the tertiary volume 502, the backup relationship 406, and the backup relationship 550 may together constitute a data set 504.

As depicted in FIG. 5, a test bed may be created by replicating data set 504 within the same storage environment 500. In this example, the data set 504 is replicated by replicating the primary volume 450, the secondary volume 452, and the tertiary volume 502 on the primary storage system 106, the secondary storage system 106', and the tertiary storage system 106", respectively. As a result of the replication, the replicated primary volume 450', the replicated secondary volume 452', and the replicated tertiary volume 502' are generated on the primary storage system 106, the secondary storage system 106', and the tertiary storage system 106", respectively. Furthermore, the backup relationships 406 and 550 associated with the data set 504 are also replicated by detecting the backup relationships 406 and 550 and then applying the same backup relationship between their respective replicated volumes 450', 452', and/or 502'. The replicated primary volume 450', the replicated secondary volume 452', the replicated tertiary volume 502', the backup relationship 406', and the backup relationship 550' may together constitute a second data set 504', serves as a test bed that is accessible for testing failback and failover operations.

Figure 6:
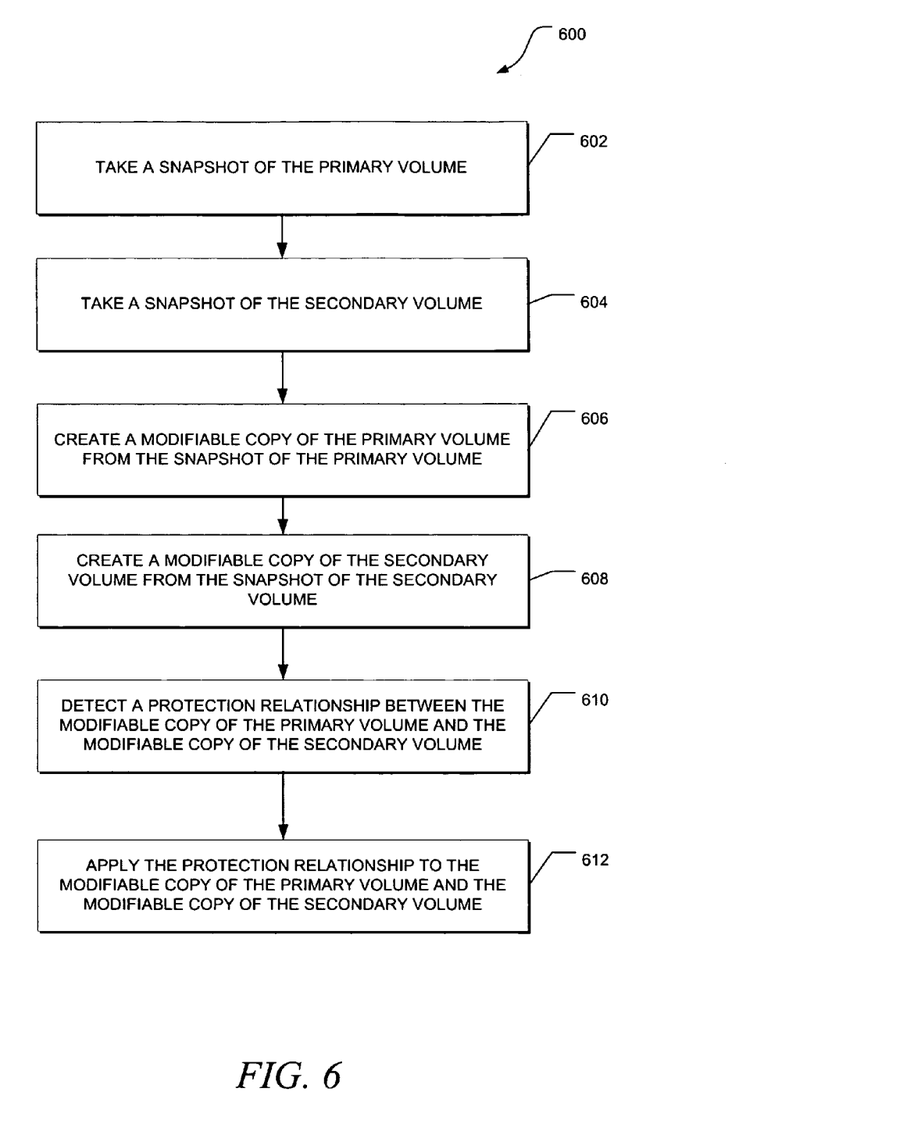
FIG. 6 depicts a flow diagram of a general overview of a method, in accordance with an example embodiment, for creating a test bed based on a modifiable copy of a snapshot.

FIG. 6 depicts a flow diagram of a general overview of a method 600, in accordance with an example embodiment, for creating a test bed based on a modifiable copy of a snapshot. In an example embodiment, the method 600 may be implemented by the data protection management module 116 of FIG. 2 and employed in processing system 202. In an example storage environment, data is stored on a primary storage system and a backup copy of the data is stored on a secondary storage system. To create a test bed in the same storage environment, the data and the backup copy of the data are replicated on their respective storage systems. It should be appreciated that the data and the backup copy of the data can be replicated in a variety of different replication techniques. In an example embodiment, replication may be in the form of a file copy, where new copies of the data and copies of the backup copy are created on their respective storage systems. In another example embodiment, the replication may be made by creating a modifiable copy of a snapshot image of a storage system.

For example, as depicted in FIG. 6, a snapshot of a primary volume of the data is taken on the primary storage system at 602. At the same time, a snapshot of the secondary volume of the backup copy is also taken on the secondary storage system at 604. In general, a snapshot is an instant copy within a file system. Such a snapshot can practically copy large amounts of data in a few seconds. More particularly, a snapshot is a space conservative, point-in-time, and read-only image of data accessible by name that provides a consistent image of that data (such as a storage system) at some previous time. A snapshot is a point-in-time representation of a storage element, such as an active file system, file or database, stored on a persistent storage device and having a name or other identifier that distinguishes it from other snapshots taken at other points in time. In a write-anywhere file system, a snapshot is an active file system image that contains complete information about the file system, including all metadata.

Thereafter, at 604, a modifiable copy of the primary volume may then be created from the snapshot of the primary volume. At the same time, a modifiable copy of the secondary volume is also created from the snapshot of the secondary volume at 608. It should be appreciated that since the modifiable copy is created from a snapshot, the modifiable copy is therefore a near-instantaneous, space efficient, and, in an example embodiment, a writable "clone" of the snapshot, which shares the same physical blocks with the baseline file system. As explained in more detail below, when the snapshot and the modifiable copy diverge (e.g., due to continuing updates in the production database or development changes to a modifiable copy of the database), the divergent blocks are separately stored. Since the creation of a modifiable copy from a snapshot is near-instantaneous, such replication technique results in minimal downtime of the accessibility of the data included in the primary volume.

Still referring to FIG. 6, the backup relationship between the primary volume and the secondary volume is detected at 710 and this detected backup relationship is applied to the modifiable copy of the primary volume and the modifiable copy of the secondary volume at 708. Here, the test bed comprises the modifiable copy of the primary volume, the modifiable copy of the secondary volume, and the backup relationship between the writable copies.

Figure 7A:
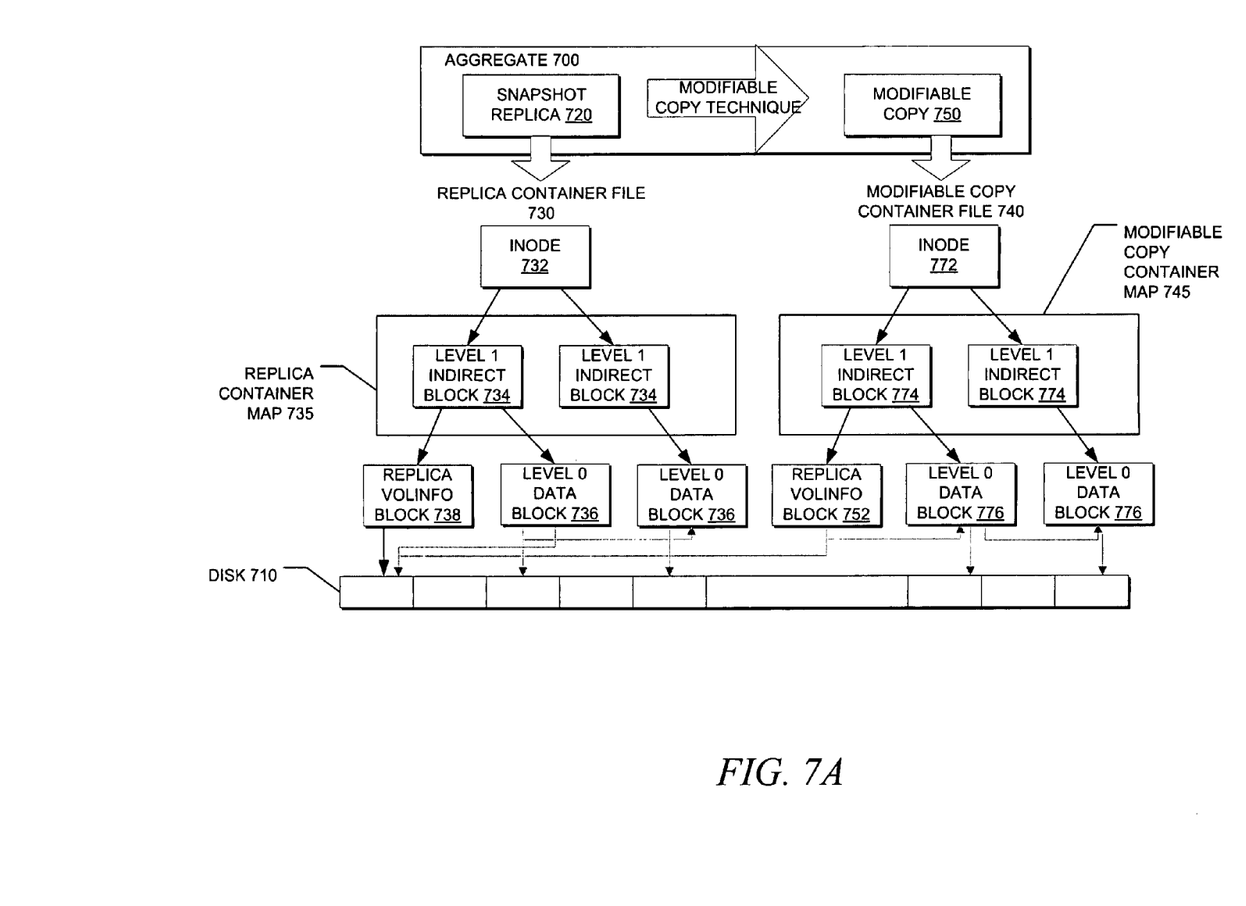
FIGS. 7A and 7B are block diagrams depicting the creation of a modifiable copy from a snapshot.
Figure 7B:
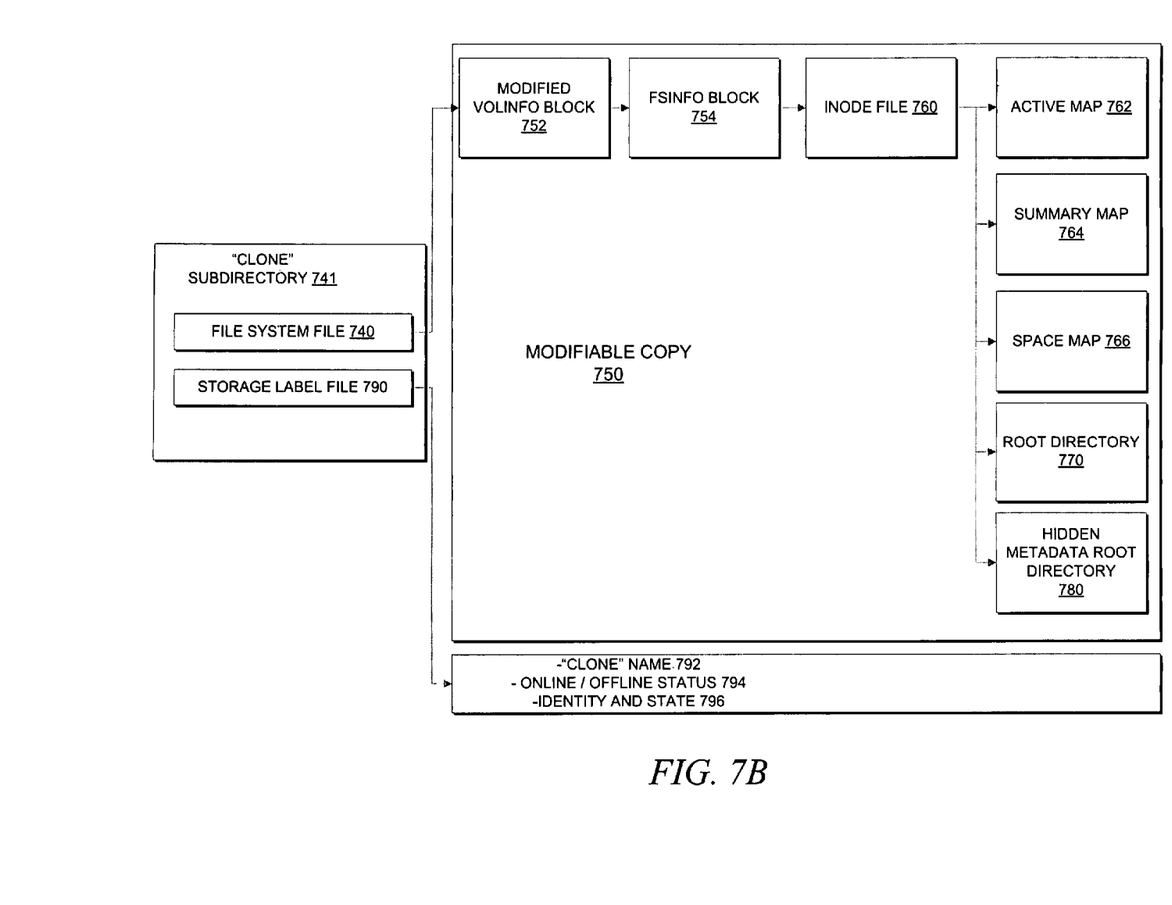

FIGS. 7A and 7B are block diagrams depicting the creation of a modifiable copy from a snapshot. In general, a snapshot is generated on a source volume (e.g., primary volume or secondary volume) and, as depicted in FIG. 7A, is duplicated as a read-only snapshot replica 720 on a target volume. A modifiable copy is then instantaneously created from the read-only snapshot replica 720 using a modifiable copy technique, which is described in more detail below, to thereby create a modifiable copy of a read-only volume.

FIG. 7A is a block diagram depicting an embodiment of an aggregate 700 on a storage system that contains snapshot replica 720. The snapshot replica 720 (or "replica 720") is essentially identical to the snapshot. Accordingly, the replica 720 comprises a replica container file 730 that is represented as a replica buffer tree having blocks in the aggregate, including inode 732, level 1 indirect blocks 734, which are organized as a replica container map 735, and level 0 data blocks 736, which comprise all of the blocks used by the replica 720, including a replica volume information block 738. It should be appreciated that an inode (e.g., inode 732) is a data structure used to store information, such as metadata, about a file, whereas data blocks (e.g., level 1 indirect blocks 734 and 774) are structures used to store the actual data for the file.

The modifiable copy technique is employed to create a new volume (e.g., file system file), along with a new root subdirectory in the aggregate 700 and a new storage label file. The new volume is embodied as a modifiable copy 750 and comprises an appropriately sized modifiable copy container file 740 represented as a modifiable copy buffer tree having a plurality of blocks in the aggregate, including inode 772, level 1 indirect blocks 774, which are organized as a modifiable copy container map 745, and level 0 data blocks 776, which comprise all of the blocks used by the modifiable copy. Initially, the modifiable copy container file 740 has no (zero) data, and the container map 745 is empty because the only blocks used by the modifiable copy are those inherited from the parent volume. Moreover, a volume information block for the modifiable copy 750 is created that is a slightly modified version of the volume information block 738 from the replica 720. The modified volume information block 752 is written to (store at a level 0 data block) the container file 740 of the new volume modifiable copy.

It should be noted that the modifiable copy container file 740 only holds all blocks allocated to the modifiable copy 750. The point of a modifiable copy is that it uses blocks "owned" by the parent volume. The modifiable copy container file 740 has "holes" at the locations of any blocks inherited from the parent volume. As an example, assume that an indirect block pointer in a file in the parent volume contains a physical volume block number and a virtual volume block number. Thus, a block in the parent container file is physical volume block number. In modifiable copy 750, the indirect block pointers are also a physical volume block number and a virtual volume block number, but an entry in the modifiable copy container file 740 is zero ("0"), indicating a hole and that the modifiable copy inherited its virtual volume block number 200 from the parent volume. Since the entry is zero, the modifiable copy "knows" that it could not free the block.

FIG. 7B is a block diagram depicting an on-disk representation of a modifiable copy 750. A hidden metadata root directory 780 in the aggregate is modified to include, for example, a new root "clone" subdirectory 741 having at least two new files, the file system file 740 (/"clone"/file system file) and storage label file 790. The storage label file is a small file that functions as an analog to a conventional raid label and, to that end, the new storage label file 790 includes the name 792 of the modifiable copy 750, the online/offline status 794 of the modifiable copy, and other identity and state information 796 of the associated modifiable copy 750.

Similarly, the new file system file 740 is a large sparse file that contains all blocks owned by a volume (modifiable copy) and, as such, is also referred to as the container file for the modifiable copy. The new file system file 740 includes a block pointer that references a file system embodied as modifiable copy 750. As a volume, the modifiable copy 750 has a volume space with special reserved inode numbers that are used for, among other things, the block allocation bitmap structures. As further described herein, the block allocation bitmap structures (e.g., active map 762, summary map 764, and space map 766) are inherited from the replica 720 (and thus the parent volume).

Specifically, the modifiable copy 750 includes a volume information block 752 that points to a file system block that, in turn, points to an inode of inode file 760 that has the same inode structure/content as the aggregate with the exceptions previously noted. The inode for the inode file contains information describing the inode file 760 associated with the file system executing on the modifiable copy 750. The inode for the inode file may contain a pointer that references (points to) an inode file indirect block containing a set of pointers that reference inodes within root directory 770 of the modifiable copy 750. Each inode contains pointers to indirect blocks, such as level 1 indirect blocks, and each indirect block includes pointers to level 0 data blocks.

Referring also to FIG. 7A, the replica volume information block 738 from the replica 720 is inserted as a level 0 data block (volume information block 752) within the container file 740 on the modifiable copy. The volume information block 752 is a slightly modified version of the replica volume information block 738. For example, the volume information block 752 is modified to delete any snapshots (file system information blocks) other than file system information block 754 for the replica 720. The inherited summary map 764 is also modified to reflect that all snapshots without modifiable copies have been removed (deleted) from the modifiable copy. The modified volume information block 752 is thus substantially similar to replica volume information block 738 and, to that end, essentially incorporates the replica base snap-shot into the modifiable copy. Accordingly, the replica 720 (and its associated safeguards) protects the snapshotted blocks from being overwritten. All new changes are written to block locations in the virtual volume block number and physical volume block number spaces of the replica (parent volume) that are not used and, thus, cannot interfere with the modifiable copy.

Since the modified volume information block 752 forms the root of a modified volume information buffer tree that is similar to a replica volume information block buffer tree of the replica 720, all blocks of the replica volume information block buffer tree can be accessed when traversing the modified volume information block buffer tree. In other words, the replica volume information block 738 stored in a level 0 block of the replica container file 730 contains pointers that reference other blocks of its buffer tree stored in other level 0 blocks 736 of the container file 730. The pointers within the volume information block 738 to the other level 0 blocks 736 are physical pointers that reference physical block locations on disk 710. Those replica volume information buffer tree blocks can be accessed through the modified volume information block 752 of the modifiable copy 750 in the same manner as traversing the replica container file tree 730 because the blocks within the modified volume information block buffer tree are the physical blocks represented by the level 0 data blocks 736 in the replica container file 730. Ultimately, the replica volume information block 738 and the modified volume information block 752 reference the same physical block locations on disk 710.

The modifiable copy 750 may then be instantiated by, e.g., loading a file system associated with the new volume onto the modifiable copy and bringing the modifiable copy "online," with the only blocks owned by the modifiable copy comprising its modified volume information block. The file system executes on the modifiable copy as it would on a typical volume, such as the parent volume. The file system within the modifiable copy actually resembles the file system within the replica base snapshot, since they comprise substantially the same blocks on a disk. The resulting modifiable copy 750 is thus a "full-fledged" volume such that it can service storage (read and write) requests and has its own logical properties, such as snapshot operation functionality, that enables the modifiable copy to be snapshotted, snap restored, and otherwise manipulated as any other volume. As a result, the modifiable copy technique enables the modifiable copy and parent volume to share on-disk blocks of data in a zero-copy fashion, similar to a snapshot, while also allowing for modifications (unlike the snapshot).

Figure 8:
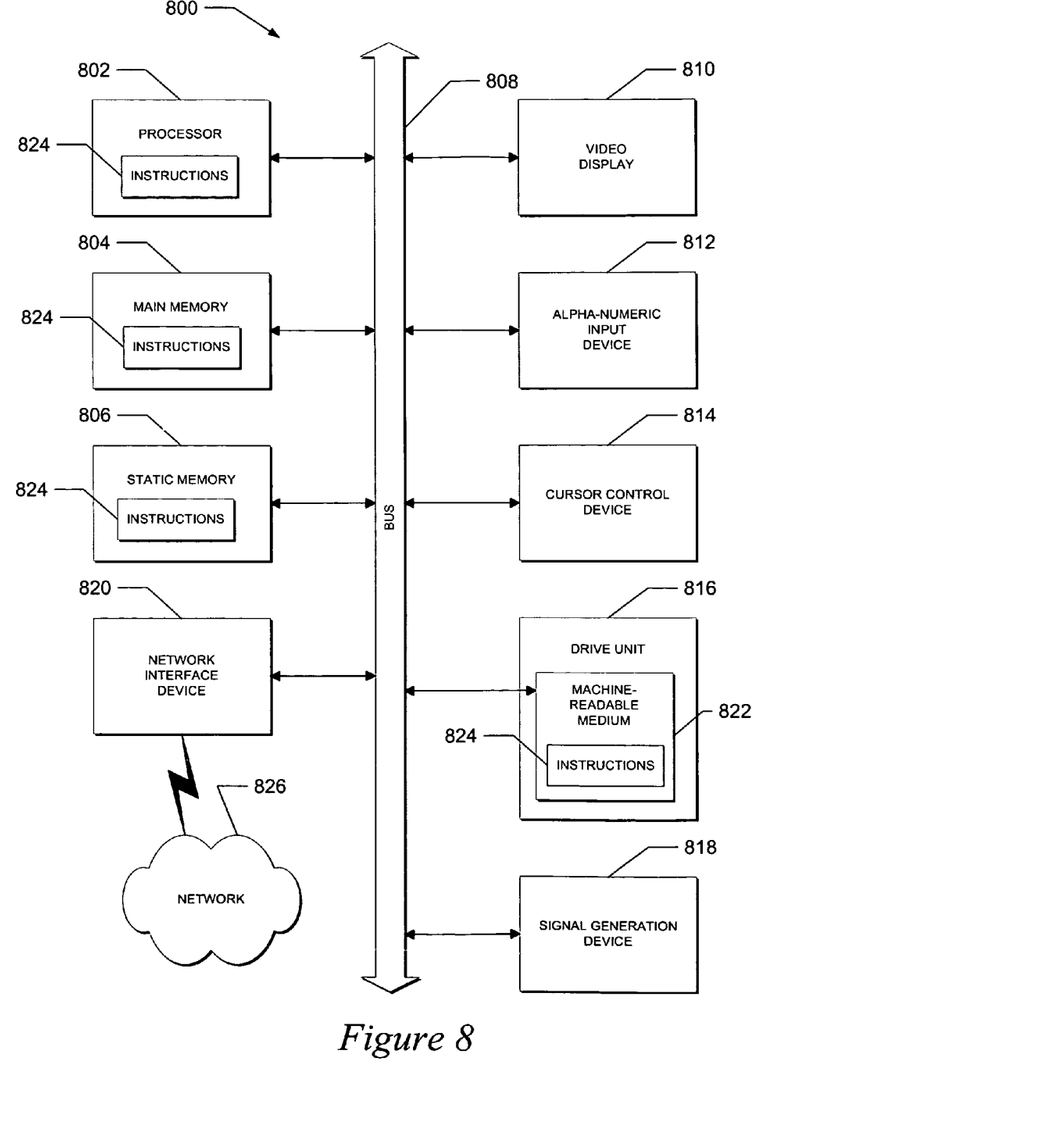
FIG. 8 is a simplified block diagram of a machine in the example form of a processing system within which a set of instructions, for causing the machine to perform any one or more of the methodologies discussed herein, may be executed.

FIG. 8 is a simplified block diagram of a machine in the example form of a processing system within which a set of instructions, for causing the machine to perform any one or more of the methodologies discussed herein, may be executed. In alternative embodiments, the machine may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

Example processing system 800 includes processor 802 (e.g., a central processing unit (CPU), a graphics processing unit (GPU) or both), main memory 804 and static memory 806, which communicate with each other via bus 808. The processing system 800 may further include video display unit 810 (e.g., a plasma display, a liquid crystal display (LCD) or a cathode ray tube (CRT)). The processing system 800 also includes alphanumeric input device 812 (e.g., a keyboard), user interface (UI) navigation device 814 (e.g., a mouse), disk drive unit 816, signal generation device 818 (e.g., a speaker) and network interface device 820.

The disk drive unit 816 includes machine-readable medium 822 on which is stored one or more sets of instructions and data structures (e.g., software 824) embodying or utilized by any one or more of the methodologies or functions described herein. Software 824 may also reside, completely or at least partially, within main memory 804 and/or within processor 802 during execution thereof by computing system 800, with main memory 804 and processor 802 also constituting machine-readable, tangible media. The software 824 may further be transmitted or received over network 826 via network interface device 820 utilizing any one of a number of well-known transfer protocols (e.g., Hypertext Transfer Protocol (HTTP)).

While machine-readable medium 822 is shown in an example embodiment to be a single medium, the term "machine-readable medium" should be taken to include a single medium or multiple media (e.g., a centralized or distributed database, and/or associated caches) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

While the invention(s) is (are) described with reference to various implementations and exploitations, it will be understood that these embodiments are illustrative and that the scope of the invention(s) is not limited to them. In general, techniques for creating a test bed may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A method of creating a test bed from data stored on a first storage system and a backup copy of the data stored on a second storage system, the method comprising:
    replicating the data to generate a replicated data on the first storage system;
    replicating the backup copy of the data to generate a replicated backup copy on the second storage system;
    detecting a backup relationship between the data and the backup copy from a plurality of different backup relationships, the data stored on the first storage system being backed up onto the second storage system based on the backup relationship; and
    applying the detected backup relationship to the replicated data and the replicated backup copy, the replicated data stored on the first storage system being backed up onto the second storage system based on the detected backup relationship, wherein the test bed comprises the replicated data, the replicated backup copy, and the detected backup relationship, the test bed being accessible for testing at least one of a failover operation or a failback operation.

2. The method of claim 1, wherein the backup relationship identifies a process used to create the backup copy.

3. The method of claim 1, wherein the replicating of the data comprises:
    taking a snapshot of the data; and
    creating a modifiable copy from the snapshot, the modifiable copy being the replicated data.

4. The method of claim 1, wherein the replicating of the backup copy of the data comprises:
    taking a snapshot of the backup copy; and
    creating a modifiable copy from the snapshot, the modifiable copy being the replicated backup copy.

5. The method of claim 1, wherein the backup relationship identifies that the backup copy of the data is a minor of the data.

6. The method of claim 1, wherein the backup relationship identifies that the backup copy of the data is a scheduled backup of the data.

7. A method of creating a test bed from a primary volume of data stored on a first storage system and a secondary volume of a backup copy of the data stored on a second storage system, the method comprising:
    replicating the primary volume to generate a replicated primary volume on the first storage system, the replicated primary volume being a modifiable copy of the primary volume;
    replicating the secondary volume to generate a replicated secondary volume on the second storage system, the replicated secondary volume being a modifiable copy of the secondary volume;
    detecting a backup relationship between the primary volume and the secondary volume from a plurality of different backup relationships, the detected backup relationship identifying a process used to create the secondary volume, the primary volume of data stored on the first storage system being backed up onto the second storage system; and
    applying the detected backup relationship between the replicated primary volume and the replicated secondary volume, the replicated primary volume of data stored on the first storage system being backed up onto the second storage system based on the detected backup relationship,
    wherein the test bed comprises the replicated primary volume, the replicated secondary volume, and the detected backup relationship, the test bed being accessible for testing at least one of a failover operation or a failback operation.

8. The method of claim 7, wherein the replicating of the primary volume comprises:
    taking a snapshot of the primary volume; and
    creating the modifiable copy of the primary volume from the snapshot.

9. The method of claim 7, wherein the replicating of the secondary volume comprises:
    taking a snapshot of the secondary volume; and
    creating the modifiable copy of the secondary volume from the snapshot.

10. The method of claim 7, wherein the primary volume and the secondary volume are accessible during the testing of the at least one of the failover operation or the failback operation.

11. The method of claim 7, wherein data integrities of the primary volume and the secondary volume are maintained during the testing of the at least one of the failover operation or the failback operation.

12. A processing system, comprising:
    at least one processor; and a non-transitory, machine-readable medium in communication with the at least one processor, the non-transitory, machine-readable medium storing a data protection management module that is executable by the at least one processor, the data protection management module being executed by the at least one processor to cause the operations to be performed, comprising:
- replicating data stored on a first storage system to generate a replicated data on the first storage system;
- replicating a backup copy of the data stored on a second storage system to generate a replicated backup copy on the second storage system;
- detecting a backup relationship between the data and the backup copy from a plurality of different backup relationships, the data stored on the first storage system being backed up onto the second storage system based on the detected backup relationship; and
- applying the detected backup relationship to the replicated data and the replicated backup copy, the replicated data stored on the first storage system being backed up onto the second storage system based on the detected backup relationship.

13. The processing system of claim 12, wherein the first storage system is a file server.

14. The processing system of claim 12, wherein the processing system is a computer that is in communication with the first storage system.

15. The processing system of claim 12, wherein the backup relationship identifies that the backup copy of the data is a mirror of the data.

16. The processing system of claim 12, wherein the backup relationship identifies that the backup copy of the data is a scheduled backup of the data.

17. The processing system of claim 12, wherein the operation of replicating the data causes the operations comprising:
- taking a snapshot of the data; and
- creating a modifiable copy of the data from the snapshot.

18. The processing system of claim 12, wherein the operation of replicating the backup copy of the data causes the operations comprising:
- taking a snapshot of the backup copy; and
- creating a modifiable copy of the backup copy from the snapshot.

19. The processing system of claim 12, wherein the operation of detecting the backup relationship causes the operations comprising:
- transmitting a request for the backup relationship to the first storage system; and
- receiving a response to the request from the first storage system, the response identifying the backup relationship.

* * * * *